United States Patent [19]

Rosenberg et al.

[11] Patent Number: 5,740,430

[45] Date of Patent: Apr. 14, 1998

[54] METHOD AND APPARATUS FOR SERVER-INDEPENDENT CACHING OF DYNAMICALLY-GENERATED CUSTOMIZED PAGES

[75] Inventors: Jonathan Rosenberg, Annandale; Munish Gandhi, Bridgewater, both of N.J.

[73] Assignee: C/Net, Inc., San Francisco, Calif.

[21] Appl. No.: 554,168

[22] Filed: Nov. 6, 1995

[51] Int. Cl.$^6$ .................................................. G06F 17/00
[52] U.S. Cl. .......................................... 395/616; 395/601
[58] Field of Search ................................... 395/601, 602, 395/606, 616, 619

[56] References Cited

U.S. PATENT DOCUMENTS

| | | | |
|---|---|---|---|
| 5,202,982 | 4/1993 | Gramlich et al. | 395/600 |
| 5,473,772 | 12/1995 | Halliwell et al. | 395/650 |
| 5,504,879 | 4/1996 | Eisenberg et al. | 395/600 |

OTHER PUBLICATIONS

Dasgupta, Partha, "Resource Location in Very Large Networks", IEEE, pp. 156–163, May, 1994.

Vetter, Ronald J., "Mosaic and the World–Wide Web", IEEE, pp. 49–57, Oct. 1994.

Obraczka et al., "Internet Resource Discovery Services", IEEE, pp. 8–22, Sep. 1993.

Sharma et al., "Hypertext Based Distributed Object Management for Information Location and Retrieval", IEEE, pp. 102–107, 1993.

*Primary Examiner*—Thomas G. Black
*Assistant Examiner*—Donald Min
*Attorney, Agent, or Firm*—Flehr Hohbach Test Albritton & Herbert LLP; William S. Galliani; Clare T. Hartnett

[57] ABSTRACT

The invention is a method and apparatus for operating a client-server computer network such that a server computer dynacically generates and then stores customized pages requested from a client computer. Subsequent requests for previously generated customized pages are retrieved from a cache in the server computer. Since previously generated customized pages need not be re-generated, computational overhead is reduced. This functionality is achieved by transforming a file request into a customized file request. The customized includes the original file request and a selected attribute of a computer user,such as browser name, computer domain, or computer platform. When a customized file request cannot be matched to an existing file on the computer server, an error indication is generated. A customized page corresponding to the file request is created in response to the error indication.

20 Claims, 5 Drawing Sheets

METHOD AND APPARATUS FOR SERVER-INDEPENDENT CACHING OF DYNAMICALLY-GENERATED CUSTOMIZED PAGES

BRIEF DESCRIPTION OF THE INVENTION

This invention relates generally to the operation of client-server computer networks. More particularly, this invention relates to a general technique for using a server computer to store a dynamically-generated customized page so that subsequent requests for the same customized page can be retrieved from storage without having to dynamically re-generate the customized page.

BACKGROUND OF THE INVENTION

The World Wide Web (WWW) of computers is a large collection of computers operated under a client-server computer network model. In a client-server computer network, a client computer requests information from a server computer. In response to the request, the server computer passes the requested information to the client computer. Server computers are typically operated by large information providers, such as commercial organizations, governmental units, and universities. Client computers are typically operated by individuals.

To insure interoperability in a client-server computer network, various protocols are observed. For example, a protocol known as the Hypertext Transport Protocol (HTTP) is used to move hypertext files across the WWW. In addition, the WWW observes a protocol for organizing and presenting information known as the Hypertext Markup Language (HTML) protocol.

The HTTP protocol supports a feature known as "dynamically-generated customized pages". A dynamically-generated customized page results in a set of information in a particular format. The same set of information can be presented in a number of ways, depending upon whether a particular format is supported by a client computer. For example, a first client computer may support the ability to represent information in a number of columns, while a second client computer may support the ability to represent information in a table. Thus, a server computer receiving a request from the first client computer will dynamically generate the requested information in a format with columns. It will respond to a request from the second client computer by dynamically generating the requested information in table format. In this example, two customized pages are created to represent the same information.

Computer programs are used to dynamically-generate customized pages. Existing computer programs to generate customized pages do not scale well for large numbers of requests. In other words, existing methods provide a relatively slow response when a large number of requests are made for customized pages. This slow response time is attributable to the fact that in existing systems, a computer program must be executed to dynamically-generate a customized page for each request.

In view of the foregoing, it would be highly desirable to provide a technique to efficiently respond to a large number of requests for customized pages.

SUMMARY OF THE INVENTION

The invention is a method and apparatus for operating a client-server computer network such that a server computer dynamically generates and then stores customized pages requested from a client computer. Subsequent requests for previously generated customized pages are retrieved from a cache in the server computer. Since previously generated customized pages need not be re-generated, computational overhead is reduced. This functionality is achieved by transforming a file request into a customized file request. The customized file request includes the original file request and at least one selected attribute of a computer user, such as browser name, computer domain, or computer platform. When a customized file request cannot be matched to an existing file on the computer server, an error indication is generated. A customized page corresponding to the file request is created in response to the error indication.

The invention is highly advantageous because it does not require the dynamic-generation of a customized page every time a customized page is requested. Instead, previously generated customized pages can be returned to a client computer without incurring the computational overhead of re-generating the same customized page. This functionality is achieved in a server-independent manner. That is, this functionality is invoked in response to a file search error that all HTTP server programs utilize. Advantageously, the invention exploits inherent features in existing HTTP server programs. Thus, implementation of the invention does not require a customized server program and can otherwise by readily operated with existing server programs.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
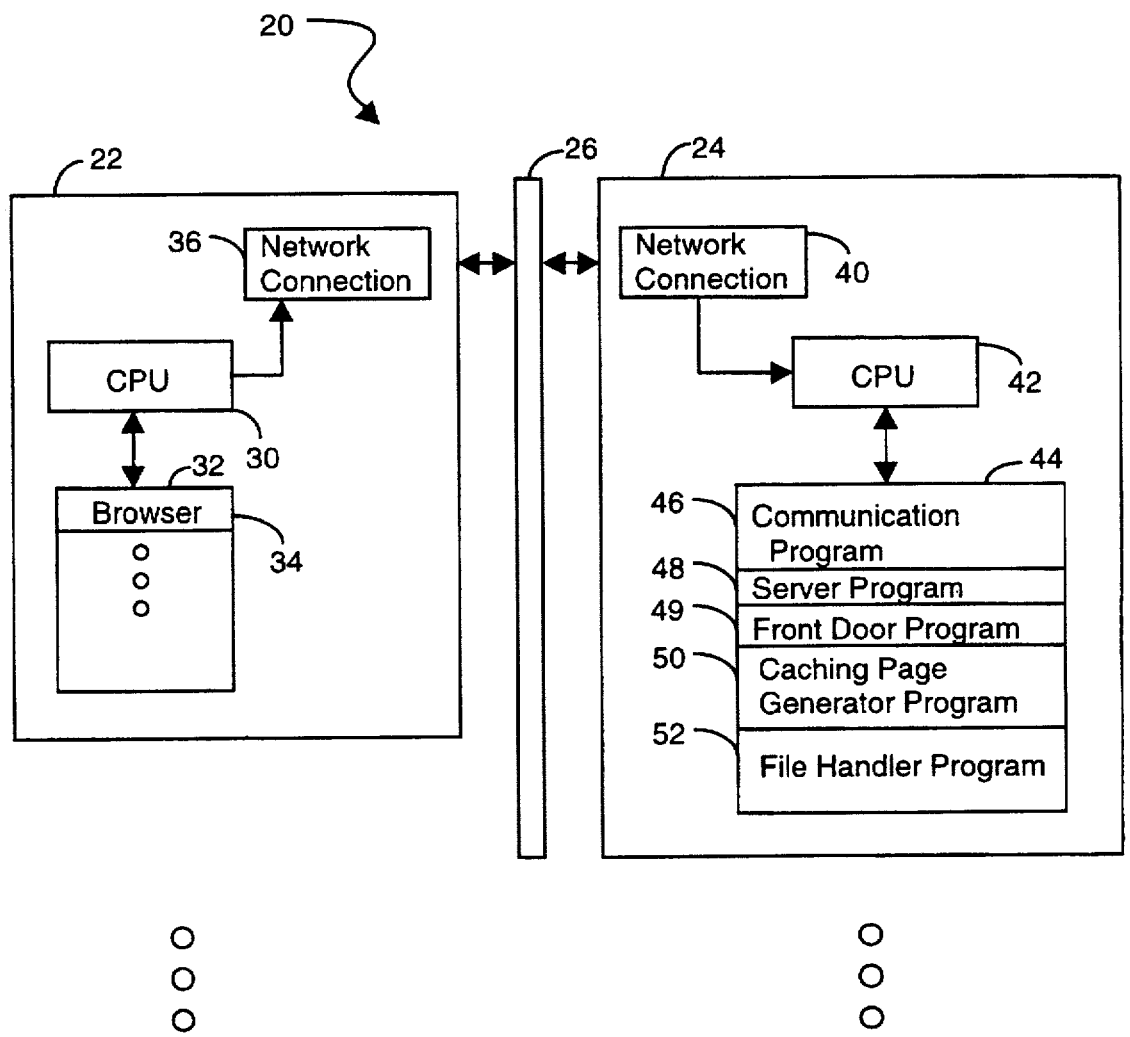
FIG. 1 illustrates a client-server computer network that may be operated in accordance with the present invention.

FIG. 1 illustrates a client-server computer network 20 that may be operated in accordance with the present invention. The network 20 includes at least one client computer 22 and at least one server computer 24. The client computer 22 and the server computer 24 are connected by a transmission channel 26, which may be any wire or wireless transmission channel.

The client computer 22 is a standard computer including a Central Processing Unit (CPU) 30 connected to a memory (primary and/or secondary) 32. The memory 32 stores a number of computer programs, including a "browser" 34. As known in the art, a browser is used to communicate with remote server computers 24 and to visually present the information received from such computers. The client computer 22 establishes network communications through a standard network connection device 36.

The server computer 24 includes standard server computer components, including a network connection device 40, a CPU 42, and a memory (primary and/or secondary) 44. The memory 44 stores a set of computer programs to implement the processing associated with the invention. The memory 44 stores a standard communication program 46 to realize standard network communications. The memory 44 also stores a standard server program 48. The program 48 may be a standard HTTP software server program, such as: NETSITE™, from Netscape, Inc., Mountain View, Calif.; NCSA from the National Center for Supercomputing Applications, Champaign, Ill.; or APACHE™, from Apache HTTP Server Project, Lincoln, Nebr.

In accordance with the invention, the standard software server program 48 is instructed to make a call to a novel front door program 49. Standard HTTP server programs include a feature that allows another program to be called when a certain condition is satisfied. In this case, the front door program 49 is called by the server program 48 when the server program 48 receives a request for a standard file name, instead of a request for a customized file name. When invoked by the server program 48, the front door program 49 transforms the standard file name into a customized file request. The customized file request is typically implemented as a combination of the initial standard file name and a selected attribute of a computer user. The selected attribute may be the browser used by the client computer 22, the domain name of the user's network connection, the platform (computer type) of the client computer 22, or some other attribute that specifies the format capabilities of the client computer 22.

The memory 44 also stores a caching page generator program 50. This program is invoked when a customized file request cannot be matched to an existing set of files stored on the server computer 24. In this case, conventional computer servers generate an error indication that is passed back to the client computer. In the HTTP protocol, this error indication is Error 404. The caching page generator program 50 of the invention intercepts any error indication by creating a customized file corresponding to the customized file request. Thus, the present invention uses an inherent feature of conventional HTTP servers, namely the file location error signal, to invoke the caching page generator program 50. Instead of simply returning an error signal to a client computer 24, the caching page generator program 50 generates a customized file for the client computer 24.

The customized file created by the server computer 24 is stored by the file handler program 52. The server program 48 simultaneously passes the contents of the customized file to the client computer 22.

Figure 2:
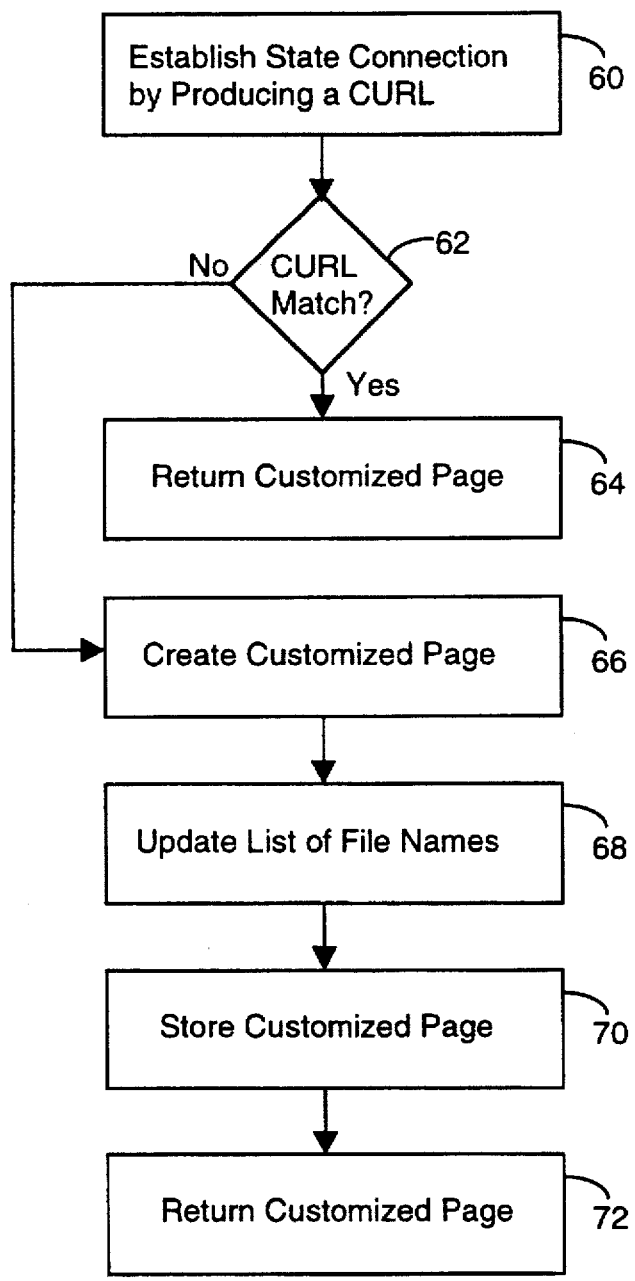
FIG. 2 illustrates the processing associated with one embodiment of the present invention.

This brief description of the invention is more clearly understood in reference to FIG. 2. FIG. 2 illustrates processing steps that may be executed in accordance with one embodiment of the invention. The first processing step shown in FIG. 2 is to establish a "state connection" with a server computer 24 (step 60). The HTTP protocol used by the WWW is "stateless". That is, each request to a server computer 24 from a client computer 22 operates by: (1) establishing a connection between a client computer 22 and a server computer 24; (2) sending a request from the client computer 22 to the server computer 24; (3) returning the requested information from the server computer 24 to the client computer 22; and (4) closing the connection between the client computer 22 and the server computer 24. Since each interaction between a client computer 22 and a server computer 24 results in the opening and closing of a communication session, the server computer 24 does not maintain "state information" regarding previous connections to a particular client computer 24.

In accordance with the invention, a customized file name is created when an initial connection is made between a client computer 22 and a server computer 24. Thus, in a subsequent connection between the client computer 22 and the server computer 24, the customized file name is effectively attributed to a previous state connection with a particular client computer 22. Once this state connection is established, the customized file name is processed in accordance with the invention, as will be described below.

The customized file name may be implemented as a CURL. CURL is an acronym for Customized Uniform Resource Locator. A Uniform Resource Locator or URL specifies a protocol, a computer, and a file. A typical URL is "http://cnet/123". This URL is an instruction to retrieve the file 123 from the computer "cnet" using the HTTP protocol. A URL may also be used to invoke a specified function on a remote computer, with the remote computer returning the results of the invoked and executed function.

As shown in FIG. 2, the customized file request or CURL is used to find a match (step 62). That is, the CURL is compared to the file names stored on the server computer 24. If a match is found, then a customized page is sent from the server computer 24 to the client computer 22 (step 64). If no match is found, then an error indication is generated on the server computer 24. The caching page generator program 50 responds to the error indication by creating a customized page (step 66). A customized page is created by using information in the customized file request. As indicated above, the customized file request is typically implemented as a combination of the initial file name and a selected attribute of a computer user. The server computer 24 uses the initial file name to identify the set of information that will be sent to the client computer 22. It uses the selected attribute to customize the set of information. As will be discussed below, the selected attribute provides sufficient information for the server computer 24 to identify what formats are supported by the client computer 22.

After the creation of the customized page (step 66), the list of file names is updated (step 68). The customized page is then stored (step 70) and returned (step 72) to the client computer 22 (steps 68, 70, and 72 may be performed simultaneously).

At this point, a number of unique attributes of the present invention will be recognizable to those skilled in the art. A primary novel attribute of the present invention is that it is capable of storing and retrieving customized files and the customized pages contained therein. Thus, a program need not be executed to form a customized file each time a customized file is called. Instead, the program is only executed once. Thereafter, the customized file is stored in the memory 44 of the server computer 24. Consequently, subsequent requests for the customized file can be quickly processed.

This highly desirable functionality is achieved through the specification of a customized file name format. The customized file name format is immediately invoked with an original file request at a computer server 24.

The present invention is highly advantageous because it can be implemented with any number of HTTP software server programs. Thus, it is considered server-independent. The invention is also advantageous in its ability to use standard server computer 24 resources, such as the native file handling capabilities of a server computer 24. The details of the invention and its benefits will be more fully appreciated with reference to FIGS. 3–5.

Figure 3:
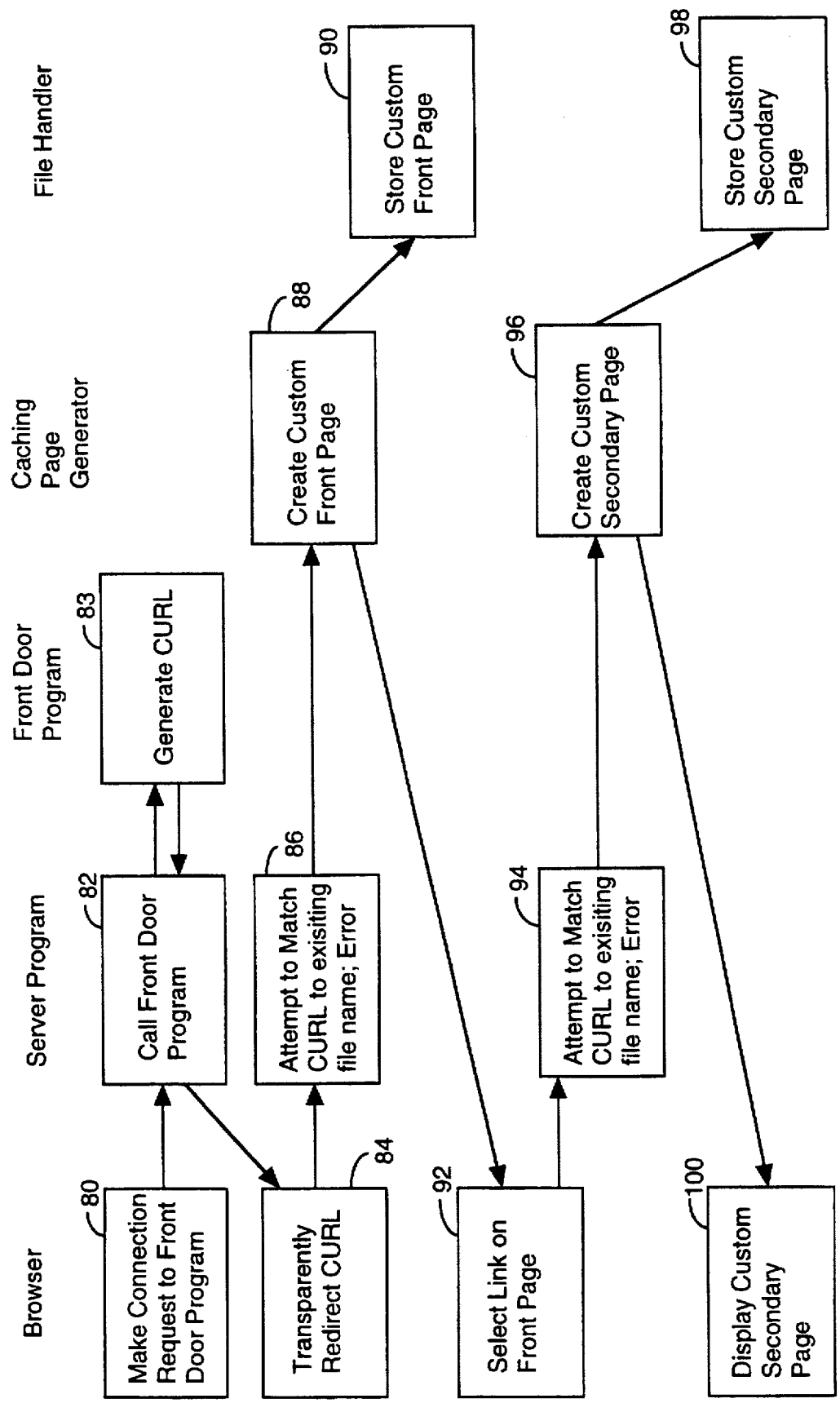
FIG. 3 illustrates the processing performed by various software programs in one embodiment of the invention.

FIG. 3 illustrates the processing performed by various software modules of the present invention. As shown in the figure, a browser 32 is used to request a front door connection at a server computer 24 (step 80). The connection request is then processed by the server program 48 by calling the front door program 49 (step 82). The front door program 49 processes the request by forming a CURL (step 83). For example, suppose that the connection request indicated that "pageX" on the server computer 24 should be returned to the client computer 22. Further, suppose that the client computer 22 is using "browserY" (through its interaction with the client computer 22, the server computer 24 knows which browser 34 the client computer 22 is using). In this case, the customized file may be defined as "pageX, browserY". In this example, the customized file name is a combination of a requested page and a selected attribute, namely the browser type. The customized file name may be formed in any number of ways. The only limitations in this regard are that the requested page must be recognizable, the selected attribute must be recognizable, and the name must be a valid name for the controlling operating system.

Note that in the prior art, the request for "pagerX" would have simply resulted in the return of the "pageX" information to the client computer 22. In contrast, the present invention changes the name of the initial file request, and then "redirects" it back to the server computer 24. As known in the art a "redirect" command is an address passed from a server computer 24 to a client computer 24, which the client computer 24 uses to access a server computer specified in the address. For example, the CURL generation operation of step 83 may result in the following redirect command being generated "http://server_24/pageX,browserY". The browser 24 receives this command and executes it (step 84), resulting in a re-connection to the server 24 ("server_24") that generated the CURL.

At this point, the server program 48 recognizes the customized file format observed by the incoming command. Namely, it notes that a page is specified ("pageX") and a selected attribute is specified ("browserY"). Consequently, the server computer 24 recognizes that a previous connection has been made with this client computer 22 and there is no need to generate a customized file name. Instead, the program 48 attempts to match the customized file name (CURL) to a list of files stored on the server computer 24 (step 86). In an initial state, an error indication will be generated. That is, when the server computer 24 first comes on line, it has not generated any customized pages. Thus, when an initial file request comes in and it is transformed into a customized file request, an attempt to match the customized file request will fail, thereby producing an error indication.

As indicated above, the caching page generator 50 responds to an error indication by creating a customized page (step 88). FIG. 3 refers to the creation of a custom front page. Typically, on an initial connection, a client computer 22 wants to observe the front page of a web site.

The customized page is generated by relying upon the information in the customized file request. The page specified in the initial file request is used to identify the set of information that will be returned to the client computer 24. The selected attribute of the customized file request will specify the format of the returned information. For example, "PageX" is a set of information that can be represented in a number of formats, say in a column or in a table form. The format in which it is returned to the client computer 22 depends upon a selected attribute of the client computer 22 requesting the information. As indicated above, the selected attribute may be the browser 34 of the client computer 22. In accordance with the invention, standard features of different browsers are stored by the server computer 24. Therefore, when a particular browser 34 is identified by the server computer 24, the server computer 24 can elect a particular format in which to return the requested information. Expanding on this example, assume that "BrowserY" supports tables, but not columns. When the server computer 24 receives the request for "pageX", it notes that "BrowserY" supports tables, and therefore, if appropriate, presents the information of "pageX" in a table format, thus creating a customized page.

As shown in FIG. 3, the customized page is then stored (step 90) by the file handler 52. In addition, it is passed to the browser (step 92). The customized page passed to the browser 34 may include a set of customized file requests embedded therein. For example, when a front page of a web site is returned to a browser 34, it is likely that the client computer 22 will select a link in the customized front page that request additional information from the same server computer 24 to which it is presently connected. Thus, the caching page generator 50 of the invention may change each link in a customized page to include a customized file request. For example, suppose that an un-customized front page includes a link to "pageA" of the originally accessed server computer 24. The caching page generator 50 may change this link to read "pageA, BrowserY". That is, the original page specification is appended with the previously identified selected attribute.

If the caching page generator 50 has modified the links in a customized page returned to the browser 34, then activating the link will allow the server program 48 to identify the customized file name format. Consequently, it will attempt to match the customized file name to the list of existing file names. If the caching page generator 50 has not inserted customized file names into a customized page, then the original page specification will be used. This will result in the generation of a CURL (steps 82, 83).

In the present example, an assumption is made that the caching page generator 50 created a customized page with customized file names. This results in the server program 48 attempting to match the activated customized file name with a file name existing on the server computer 24. If the specified customized page does not exist, it is generated in the manner previously described (step 96). Thereafter, the generated customized page is stored by the file handler 52 (step 98) and is passed to the browser 34, where it is displayed (step 100).

Figure 4:
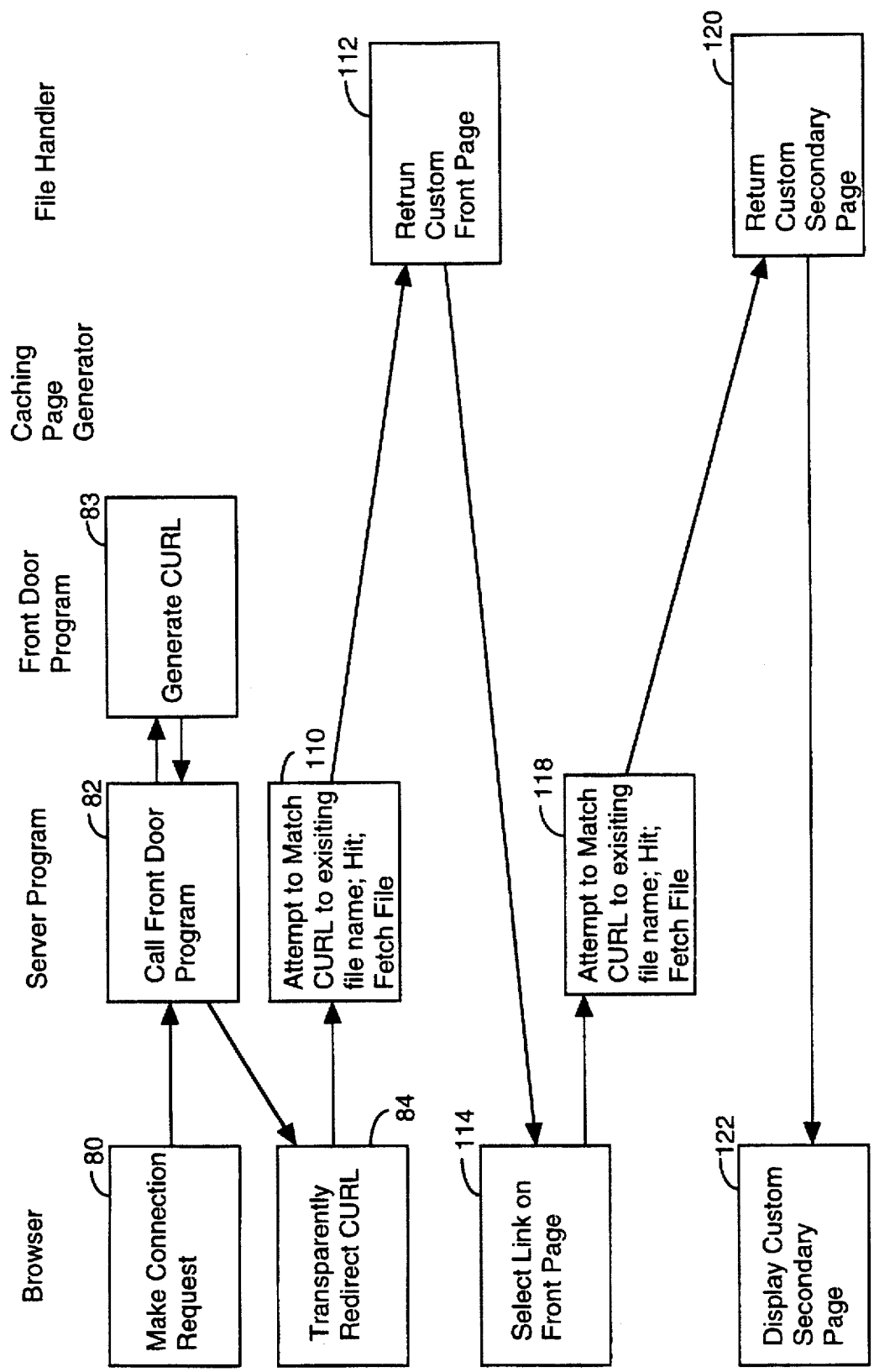
FIG. 4 illustrates the processing performed by various software programs in one embodiment of the invention.

The processing shown in FIG. 4 generally corresponds to the processing shown in FIG. 3, with one notable exception. In FIG. 4, the caching page generator 50 is not invoked because the requested customized pages were previously generated, and therefore they exist in the server memory 46.

Note at step 110 in FIG. 4 that the attempt to match the CURL results in a file hit, meaning that the requested file was generated from a previous transaction and resides in memory. A fetch command is then processed by the file handler 52, which returns the requested file. The same operation is then repeated at steps 118 and 120.

Figure 5:
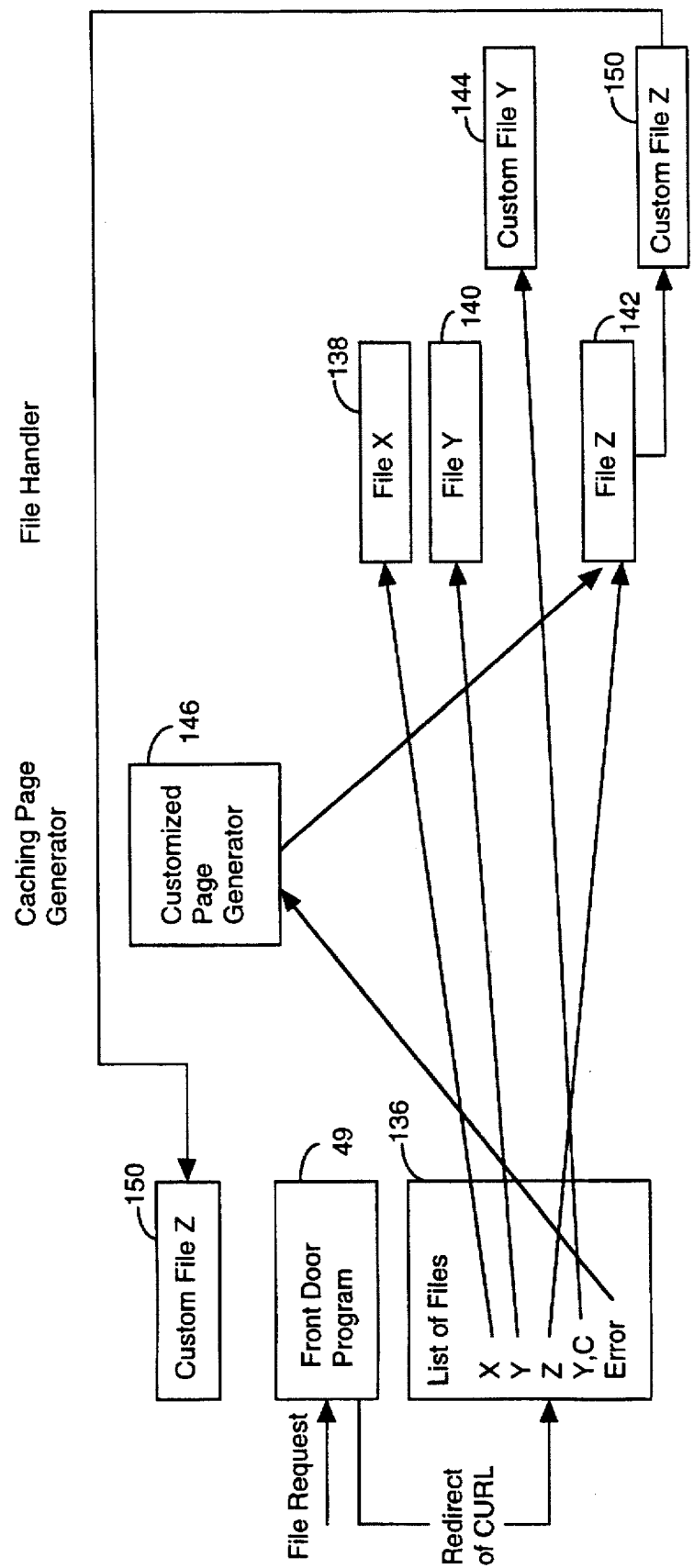
FIG. 5 is a more detailed representation of various file handling operations performed in accordance with the invention.

FIG. 5 is a more detailed illustration of the file handling operations associated with the present invention. Note that an initial file request is handled by the front door program 49. As previously discussed, this results in the redirection of a customized file request back to the server computer 24. At this point the server program 48 attempts to match the incoming customized file request with its list of existing files 136. FIG. 5 illustrates three standard files, File X, File Y, and File Z. Each file is listed in the list of files 136. Each listed file has an associated pointer, as shown in FIG. 5, to the server computer 24 memory 44 location that holds its corresponding file content.

The list of files 136 of FIG. 5 also includes a reference to a customized file "Y.C". The customized file "Y.C" has a pointer to a memory location that holds the contents of a previously created customized page.

Suppose, the incoming customized file name is "Z.C". In this case, when the server program 48 attempts to match the file name with the list of file names, it results in an error indication. The error indication is identified by a customized page generator 146 of the caching page generator 50. The customized page generator 146 uses the original page designation to identify File Z in memory and it uses the selected attribute to determine how the information in File Z should be returned to the client computer 22. This information is then used to create Custom File Z 150. The file handler 52 stores Custom File Z 150. In addition, Custom File Z is passed to the server program 48. After creating a customized page, the customized page generator 146 updates the list of files 136. Thus, in this example, the list of files 136 would be amended to include file name "Z.C".

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of operating a server computer, said method comprising the steps of:

storing a set of standard files and customized files on said server computer;

generating a Hypertext Transport Protocol (HTTP) path error indication when a requested file name cannot be matched to said standard files and said customized files; and in response to said error indication, automatically creating a customized page corresponding to said requested file name.

2. The method of claim 1 wherein said requested file name is a customized file name specified in a customized Hypertext Markup Language (HTML) page generated by said server computer during a previous state connection.

3. The method of claim 1 further comprising the step of producing said requested file name from an initial file request.

4. The method of claim 3 wherein said producing step includes the step of combining said initial file request with a selected attribute of a computer user to produce said requested file name.

5. The method of claim 4 wherein said combining step includes the step of using a selected attribute from the group including browser name, computer domain, and computer platform.

6. The method of claim 5 wherein said selected attribute is used in said creating step to create said customized page.

7. The method of claim 1 further comprising the step of updating a list of file names in response to said creating step.

8. The method of claim 3 further comprising the steps of:

transforming said initial file request into a customized file request; and using said customized file request in a redirect command to cause said customized file request to return to said server computer from a client computer.

9. A method of operating a server computer, said method comprising the steps of:

transforming an initial file request into a customized file request;

generating a Hypertext Transport Protocol (HTTP) path error indication when said customized file request cannot be matched to an existing file stored on said server computer; and in response to said error indication, automatically creating a customized page corresponding to said requested file name.

10. The method of claim 9 wherein said transforming step includes the step of combining said initial file request with a selected attribute of a computer user to produce said customized file request.

11. The method of claim 10 wherein said combining step includes the step of using a selected attribute from the group including browser name, computer domain, and computer platform.

12. The method of claim 10 wherein said selected attribute is used in said creating step to create said customized page.

13. The method of claim 9 further comprising the step of updating a list of file names in response to said creating step.

14. The method of claim 9 further comprising the step of using said customized file request in a redirect command to cause said customized file request to return to said server computer from a client computer.

15. A computer readable memory that can direct a computer to function in a specified manner, comprising:

standard files and customized files stored in said computer memory; and executable instructions stored in said memory, said executable instructions including:

(A) instructions to generate a Hypertext Transport Protocol (HTTP) path error indication when a requested file name cannot be matched to said standard files and said customized files;

(B) instructions, in response to said error indication, to create a customized page corresponding to said requested file name.

16. The computer readable memory of claim 15 further comprising (C) instructions to produce said requested file name from an initial file request.

17. The computer readable memory of claim 16 wherein said instructions of element (C) include instructions to combine an initial file request with a selected attribute of a computer user to produce said requested file name.

18. The computer readable memory of claim 17 wherein said instructions of element (C) rely upon a default attribute as said selected attribute.

19. The computer readable memory of claim 17 further comprising (D) instructions to use said selected attribute to create said customized page.

20. The computer readable memory of claim 15 further comprising (E) instructions to update a list of file names in response to the instructions of element (B).

* * * * *